United States Patent
Ghirnikar et al.

(10) Patent No.: US 6,381,241 B1
(45) Date of Patent: *Apr. 30, 2002

(54) DUPLICATE MESSAGE DETECTION AND MENDING OF GARBLED MESSAGES

(75) Inventors: Avinash L. Ghirnikar; Paul J. Lima, both of San Jose; Gregory J. Pinter, Danville, all of CA (US)

(73) Assignee: Wireless Access, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,791

(22) Filed: Sep. 30, 1997

(51) Int. Cl.[7] ............... H04L 12/56; G06F 11/00; H04Q 7/20; G08B 5/22
(52) U.S. Cl. ............... 370/394; 714/797; 455/466; 340/825.44
(58) Field of Search ............... 340/825.44; 455/63, 455/38.1, 38.2, 573, 228, 466; 379/67.1; 714/822, 797, 746, 748, 751, 758, 747, 749; 370/312, 313, 394, 473, 474

(56) References Cited

U.S. PATENT DOCUMENTS

| | | | | |
|---|---|---|---|---|
| 4,835,777 A | * | 5/1989 | DeLuca et al. | 371/69 |
| 4,956,641 A | * | 9/1990 | Matai et al. | 340/825.44 |
| 5,051,999 A | * | 9/1991 | Erhart et al. | 371/41 |
| 5,099,482 A | * | 3/1992 | Cameron | 371/37.1 |
| 5,311,516 A | * | 5/1994 | Kuznicki et al. | 370/314 |
| 5,347,269 A | * | 9/1994 | Vanden Heuvel et al. | 340/825.44 |
| 5,349,588 A | * | 9/1994 | Schellinger | 714/746 |
| 5,384,565 A | * | 1/1995 | Cannon et al. | 340/825.44 |
| 5,426,643 A | * | 6/1995 | Smolinske et al. | 370/100 |
| 5,426,653 A | * | 6/1995 | Hayes et al. | 371/36 |
| 5,487,068 A | * | 1/1996 | Smolinske et al. | 370/94.1 |
| 5,490,168 A | * | 2/1996 | Phillips et al. | 375/224 |
| 5,546,394 A | * | 8/1996 | Eaton et al. | 370/79 |
| 5,577,045 A | * | 11/1996 | Faris et al. | 370/252 |

(List continued on next page.)

OTHER PUBLICATIONS

Motorola, "Page Finder User's Guide" 1997, pp. 1–16.
Skytel "Sky Word Plus—Store and Deliver Paging" 1997, product literature #1.
Skytel "Sky Word Plus—Get Skytel. Get the Message" 1997, product literature #2.

*Primary Examiner*—Dwayne Bost
*Assistant Examiner*—Joy Contee
(74) *Attorney, Agent, or Firm*—Blakely, Sokoloff, Taylor & Zafman LLP (57) ABSTRACT

A method and apparatus for detecting duplicate messages and correcting garbled messages in a wireless communication device are provided. According to one aspect of the present invention, erred messages received by a wireless communication device are corrected. A first message fragment is received by the wireless communication device. The first message fragment is corrected based upon a second message fragment after it has been determined that the first message fragment contains one or more errors. According to another aspect of the present invention, a wireless communication device includes a receiver configured to receive messages transmitted over a forward channel from a messaging system; a transmitter configured to transmit responses over a reverse channel to the messaging system; and a processor. The processor is coupled to the receiver to receive messages from the messaging system. The processor is further coupled to the transmitter to transmit acknowledgments to the messaging system. Additionally, the processor is configured to correct garbled messages by determining whether or not a second message is a duplicate of the garbled message. If the second message is a duplicate of the garbled message, then the garbled message is corrected based upon the second message.

31 Claims, 9 Drawing Sheets

U.S. PATENT DOCUMENTS

| | | | |
|---|---|---|---|
| 5,592,471 A | | 1/1997 | Briskman .................. 455/52.3 |
| 5,625,881 A | | 4/1997 | Sandler et al. ............. 455/38.3 |
| 5,652,783 A | * | 7/1997 | Keba et al. ................. 370/313 |
| 5,761,217 A | * | 6/1998 | Soumiya et al. .............. 371/30 |
| 5,856,972 A | * | 1/1999 | Riley et al. .................. 370/389 |
| 5,881,133 A | * | 3/1999 | Ryan, Jr. et al. ........... 379/67.1 |
| 5,886,645 A | * | 3/1999 | Eaton .................... 340/825.44 |
| 6,067,444 A | * | 5/2000 | Cannon et al. ............ 455/38.1 |

\* cited by examiner

DUPLICATE MESSAGE DETECTION AND MENDING OF GARBLED MESSAGES

FIELD OF THE INVENTION

The invention relates generally to the field of wireless communications and two-way wireless communications systems. More particularly, the invention relates to the detection of duplicate messages and correction of erred messages in a wireless communication device, such as a two-way pager.

BACKGROUND OF THE INVENTION

Communications systems generally transfer information between a source and a destination. Typically a communication system includes a transmitter and a receiver which transmit and receive information signals over some media, respectively. This media may be cable wiring or the atmosphere, for example. When communications occur over the atmosphere, or air waves, they are commonly referred to as "wireless" communications. Examples of wireless communications systems include digital cellular, packet data paging, digital cordless telephones, wireless modems, wireless local and wide area networks, digital satellite communications and personal communications networks.

One of the many challenges presented by a wireless communication system is reliable message delivery from a messaging system to a wireless communication device. Herein, from the perspective of the messaging system (e.g., a paging system) the term "new message" or "new fragment" will refer to the first copy of an original page or fragment thereof that is transmitted to the wireless communication device (e.g., a pager) and the term "duplicate message" or "duplicate fragment" will refer to a second or subsequent copy of the original page or fragment thereof. From the perspective of the wireless communication device, however, a "new message" or "new fragement" will refer to the first copy actually received, whether or not it corresponds to the first message/fragment transmitted by the messaging system. Accordingly, the term "duplicate message" or "duplicate fragment" at the wireless communication device refers to a system originated copy of the previously received new message/fragment. Therefore, two original pages that enter the messaging system having the same content are not considered duplicates for purposes of this discussion.

In one-way paging systems, an early approach to increase the chances of successful message reception at the wireless communication device was to transmit multiple copies of each message that entered the paging system. This prior technique is based upon an assumption that most of the time at least one of the repeated copies will be received successfully by the wireless communication device. For its part, the wireless communication device stores received messages and notifies the user of the arrival of each new message. One disadvantage to this early approach was the confusion and frustration caused by the storage and presentation of multiple copies of the same message to the user of the wireless communication device. For example, after having contacted the originator of a message, such as "Please call me ASAP," it would not be readily apparent to the user whether or not immediate action was necessary when he/she subsequently received a duplicate message that may or may not be a new message.

An improvement over the system above, is illustrated by a voting mechanism which was implemented for use with the Japanese paging system by NEC Corporation and NTT. like the system described above, multiple copies (e.g., a new message and two duplicate messages) of each original page that enter the paging system are transmitted by the paging system. However, in this prior system, logic embedded within the wireless communication device assures only one message is stored on the wireless communication device and presented to the user, thereby eliminating the uncertainty caused by duplicate messages. Upon receipt of all three copies of a particular message and before any errors are known to exist in any of the three messages, the NEC and NTT pagers perform their de-duplication logic on the messages which comprises performing symbol level voting. A majority symbol is selected for each position of the message for a particular message position from among the three messages and a final message is constructed from the selected majority symbols. Although this system improves upon the previous solution to reliable message delivery, many inefficiencies and limitations remain in this type of a compromise system. In some circumstances, construction of an error free message is unrealizable. For example, there may be no majority symbol for one or more symbol positions of the message. Additionally, messages cannot be interleaved in this prior system. That is, the network must send all blocks of a first message prior to sending any block of a second message. This extra complexity in the transmission queuing algorithms results in inefficient channel usage. Further, if a particular message is received correctly in either of the first two copies channel capacity is wasted by transmitting the subsequent message(s).

In light of the foregoing and new flexibility provided by the introduction of two-way communications systems, it is desirable to provide a wireless communication device which is not constrained to a vote among a fixed number of duplicate transmissions. Additionally, it is more efficient for a duplicate message to be transmitted only after it has been confirmed that an error has occurred (e.g., receipt of a message that includes one or more errors at the wireless communication device). Further, it is advantageous to provide a wireless communication device that makes use of the reverse channel available in two-way communications systems to facilitate the correction of garbled messages. More specifically, it is desirable for a wireless communication device to detect garbled messages and provide an indication on the reverse channel that may be used to trigger the transmission of duplicate messages after such detection. It is further desirable for the wireless communication device to distinguish between duplicate messages and new messages and to correct the garbled messages based upon corresponding duplicate messages.

SUMMARY OF THE INVENTION

A method and apparatus for detecting duplicate messages and correcting garbled messages in a wireless communication device are described. According to one aspect of the present invention, erred messages received by a wireless communication device are corrected. A first message fragment is received by the wireless communication device. The first message fragment is corrected based upon a second message fragment after it has been determined that the first message fragment contains one or more errors.

According to another aspect of the present invention, a wireless communication device includes a receiver configured to receive messages transmitted over a forward channel from a messaging system; a transmitter configured to transmit responses over a reverse channel to the messaging system; and a processor. The processor is coupled to the receiver to receive messages from the messaging system.

The processor is further coupled to the transmitter to transmit acknowledgments to the messaging system. Additionally, the processor is configured to correct garbled messages by determining whether or not a second message is a duplicate of the garbled message. If the second message is a duplicate of the garbled message, then the garbled message is corrected based upon the second message.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for detecting duplicate messages and correcting garbled messages in a wireless communication device is described. A "garbled message" or an "erred message" refers to a message containing errors that are not correctable by the error correction code employed by the particular communications protocol. In the present invention, after it has been determined that a message has not been received successfully (e.g., the message contains one or more residual errors, or is garbled) at a wireless communication device, the wireless communication device signals the messaging system to transmit a duplicate message. The duplicate message is subsequently recognized by de-duplication logic of the wireless communication device based upon one or more parameters that are discussed below. Upon recognizing the duplicate message the garbled message may be corrected (also referred to as mending) based upon the duplicate message.

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps may be embodied in machine-executable instructions, which may be used to cause a general-purpose or special-purpose processor programmed with the instructions to perform the steps. Alternatively, the steps may be performed by a combination of hardware and software. Importantly, while embodiments of the present invention will be described with reference to a handheld two-way pager, the method and apparatus described herein are equally applicable to other types of wireless communication devices such as cellular phones, wireless networking devices and the like.

AN EXEMPLARY WIRELESS COMMUNICATION DEVICE

Figure 1:
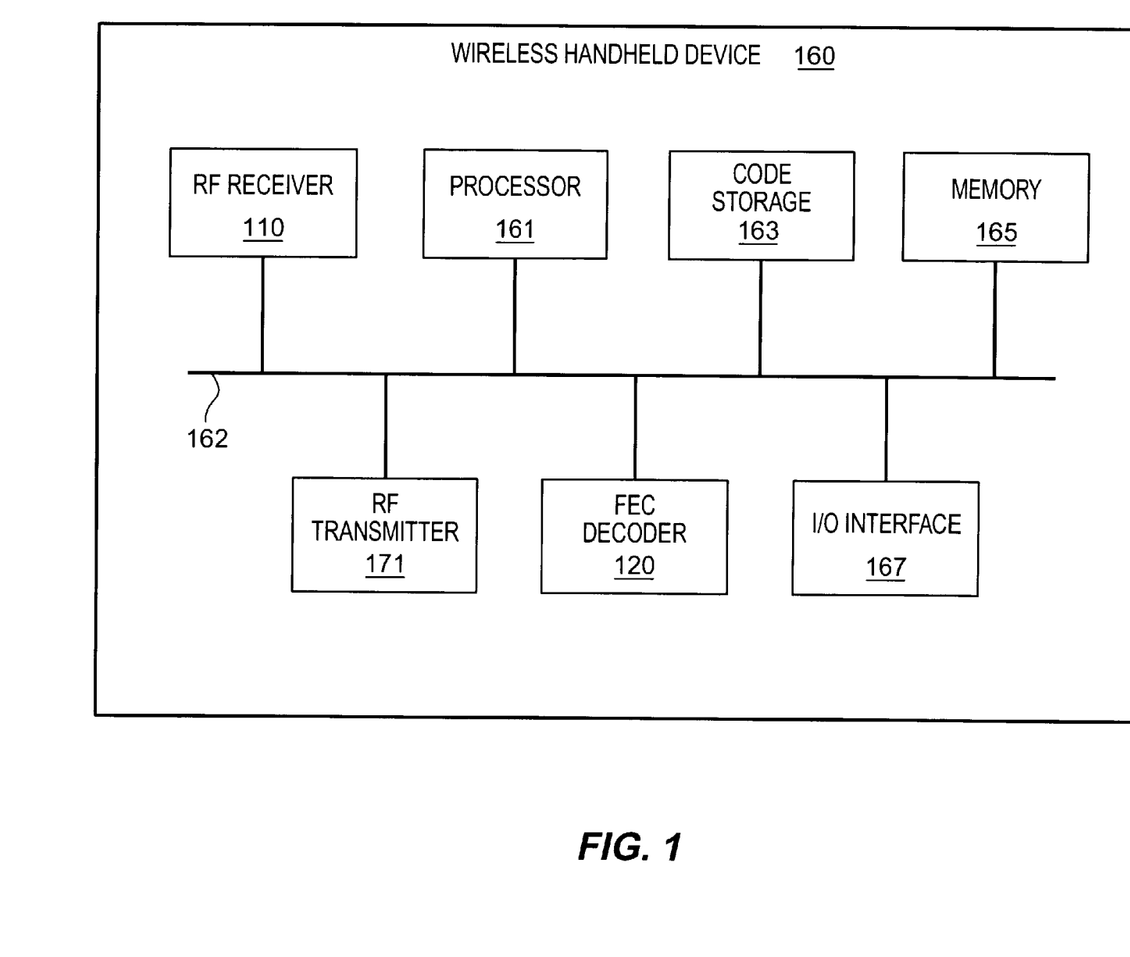
FIG. 1 illustrates an exemplary wireless communication device in which one embodiment of the present invention may be implemented.

FIG. 1 is a simplified block diagram of a handheld wireless communication device 160 in which the method of the present invention may be implemented. In the embodiment depicted, the device 160 may be a two-way electronic pager, a wireless modem, a cell telephone or any other device for receiving and transmitting RF transmissions. Device 160 includes a RF receiver 110, a RF transmitter 171, a forward error correction (FEC) decoder 120, a processor 161, a non-volatile code storage 163, a memory 165, and an I/O interface 167, all intercoupled by a bus 162. According to one embodiment of the present invention, the processor 161 executes program code stored in code storage 163 to perform the de-duplication and message mending processing described below and other functions of the device 160. Memory 165 is used to store the results of intermediate calculations and other program variables. The I/O interface 167 will typically include an assortment of components coupled to bus 162 that varies based on the application of the device 160. For example, if device 160 is an electronic pager, I/O interface 167 would typically include a number of buttons to receive user input, a display for displaying messages and other information and a notification mechanism such as a beeper or vibrator to alert the user that a message has been received. In the case of a cell telephone, I/O interface 167 would typically include a numeric keypad, certain control buttons, a microphone and a speaker. In other applications I/O interface 167 may include other components to provide application-specific functionality.

Examples of handheld wireless communication devices in which embodiments of the present invention may be implemented include the AccessLink™ pager and the AccessMate™ pager, both of which are manufactured by Wireless Access Inc. of Santa Clara, Calif. AccessLink™ and AccessMate™ are trademarks of Wireless Access Inc.

EXEMPLARY COMMUNICATION PROTOCOL SCENARIOS

Figure 2A:
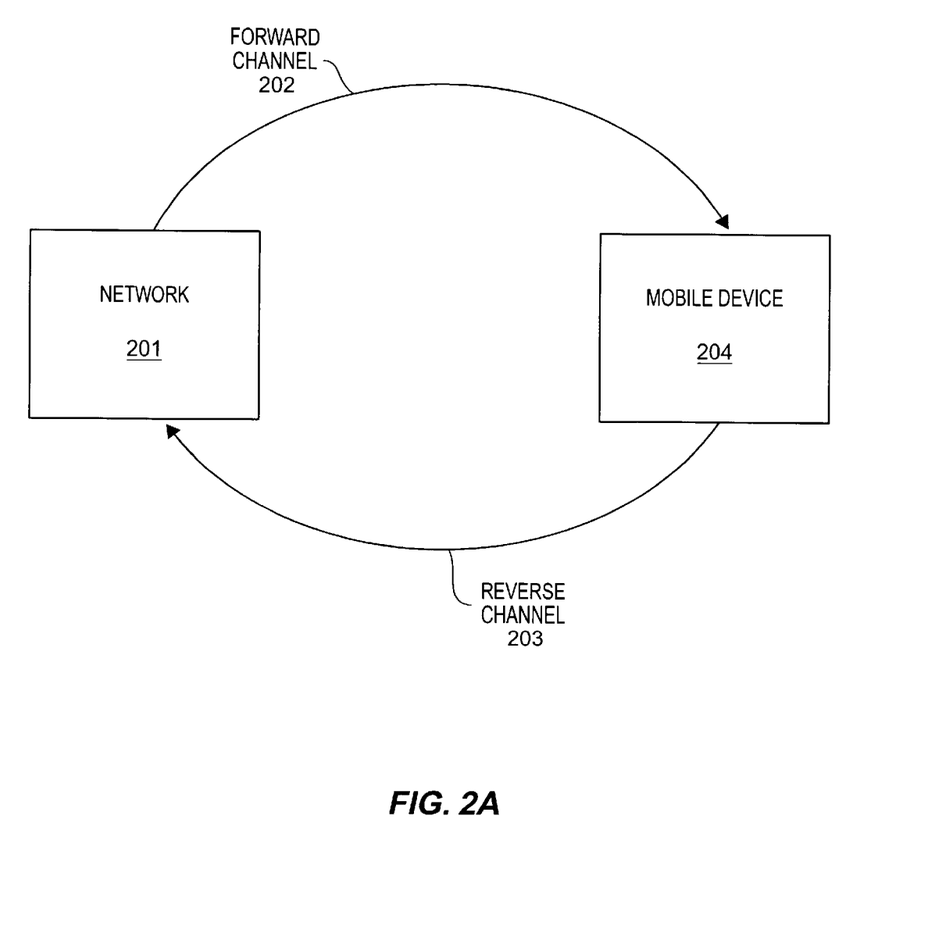
FIG. 2A illustrates an exemplary two-way communication system in which the present invention may be employed according to one embodiment of the present invention.

According to one embodiment, the method and apparatus of the present invention are designed for use in a two-way communication system 200 illustrated in FIG. 2A. The two-way communication system includes a forward channel 202 from a central network 201 to a wireless communication device 204 and a reverse channel 203 from the wireless communication device 204 to the central network 201. In one embodiment, the communication system 200 may employ a two-way paging protocol.

Figure 2B:
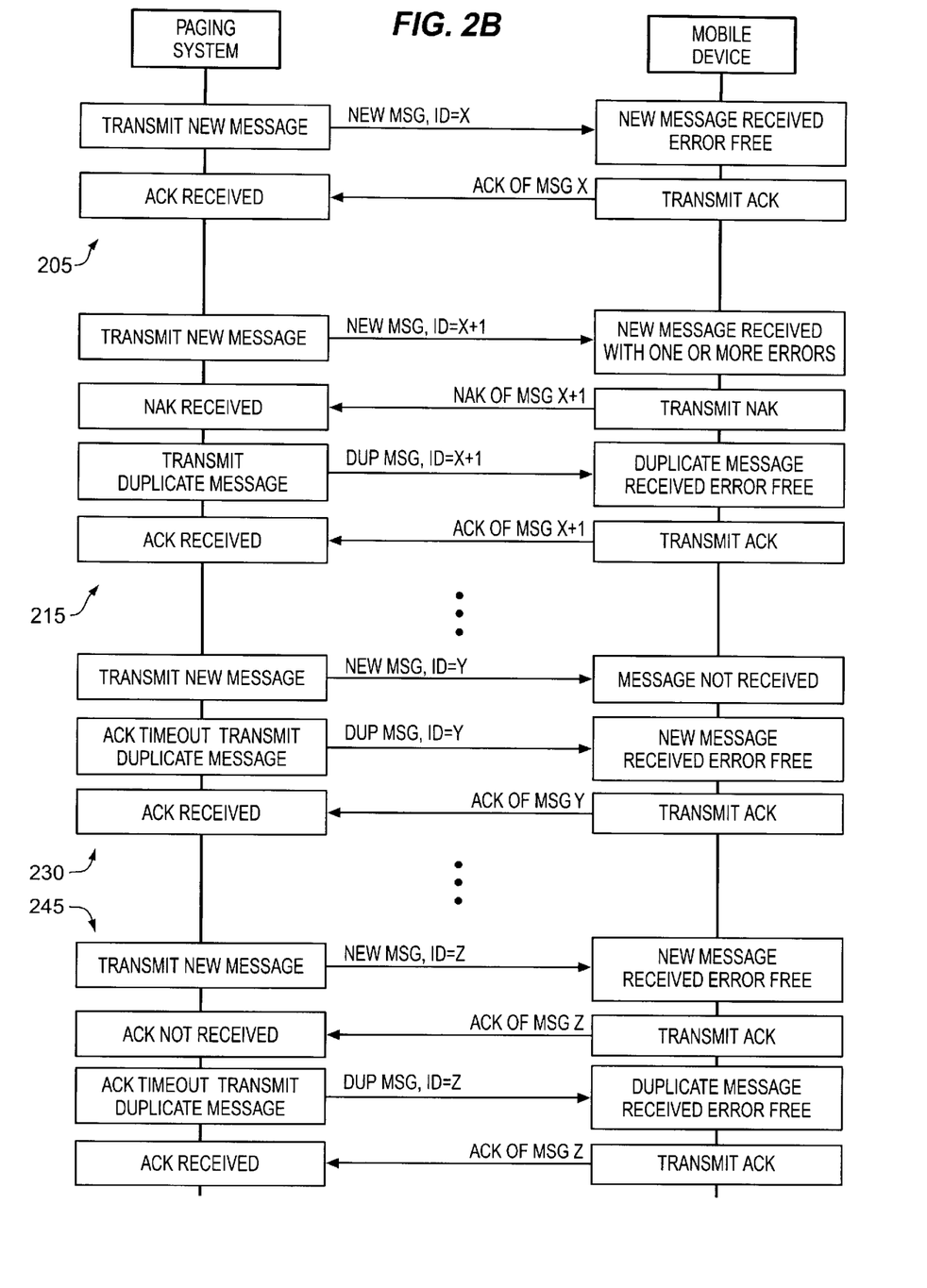
FIG. 2B illustrates the behavior, in terms of exemplary handshaking between a paging network and a wireless communication device, of a paging system in response to various circumstances that may arise according to one embodiment of the present invention.

The behavior of an exemplary two-way communication system is briefly described with reference to FIG. 2B. Actions at the paging network are listed on the left while actions at the wireless communication device are listed on the right. Arrows extending from the paging network to the wireless communication device represent messages transmitted by the paging network over the forward channel destined for the wireless communication device. Arrows extending from the wireless communication device to the paging network represent messages transmitted by the wireless communication device over the reverse channel destined for the paging network.

Message sequence 205 illustrates exemplary handshaking involved between the paging network and the wireless communication device when no errors occur on either the forward or reverse channels. During message sequence 205, the paging network transmits a new message addressed to the wireless communication device having a message id of X. The wireless communication device receives the message without error, transmits a message acknowledging the receipt of the message to the paging network, and performs new message processing, such as storing the new message and alerting the user of the arrival of the new message, for example. The paging network receives the acknowledgment without error and resets its ACK timer to prevent transmission of a duplicate message.

Message sequence 215 illustrates exemplary handshaking involved between the paging network and the wireless communication device when one or more errors occur on the forward channel during transmission of a new message to the wireless communication device. During message sequence 215, the paging network transmits a new message addressed to the wireless communication device having a message id of X+1. The wireless communication device performs new message processing and transmits a NAK in response to the message since it is received at the wireless communication device with one or more errors. Responsive to the NAK, the paging network, transmits a duplicate message with the same message id. After receiving the duplicate message and verifying that no errors were introduced during transmission, the wireless communication device transmits an ACK. Upon determining the received message is a duplicate, the wireless communication device replaces the previous message having id X+1 with the newly received message. No further duplicate messages are transmitted by the paging network upon receiving the ACK.

Message sequence 230 illustrates exemplary handshaking involved between the paging network and the wireless communication device when conditions, such as a low quality signal on the forward channel, prevent the wireless communication device from receiving a new message. During message sequence 230, the paging network transmits a new message addressed to the wireless communication device having a message id of Y. Since the wireless communication device does not receive the new message, no acknowledgment is transmitted to the paging network. Upon expiration of an acknowledgment timer at the paging network, the paging network transmits a duplicate message having the same message id. The wireless communication device receives the duplicate message without error, acknowledges receipt by transmitting an ACK to the paging network, and performs new message processing. When the paging network receives the ACK, no further duplicate messages are transmitted to the wireless communication device.

Message sequence 245 illustrates exemplary handshaking involved between the paging network and the wireless communication device when conditions, such as a low quality signal on the reverse channel, prevent the paging network from receiving the wireless communication device's acknowledgment of a new message. During message sequence 245, the paging network transmits a new message addressed to the wireless communication device having a message id of Z. The wireless communication device successfully receives the new message, transmits an acknowledgment so indicating to the paging network, and performs new message processing. Since the paging network does not receive the ACK, its ACK timer expires and a duplicate message is transmitted having the same message id. Again, the duplicate message is received successfully by the wireless communication device and an ACK is transmitted to the paging network. Upon determining that the newly received message is a duplicate, the duplicate message is discarded. This time, the paging network receives the ACK and sends no further duplicate messages.

EXEMPLARY MESSAGE FORMAT

Figure 3:
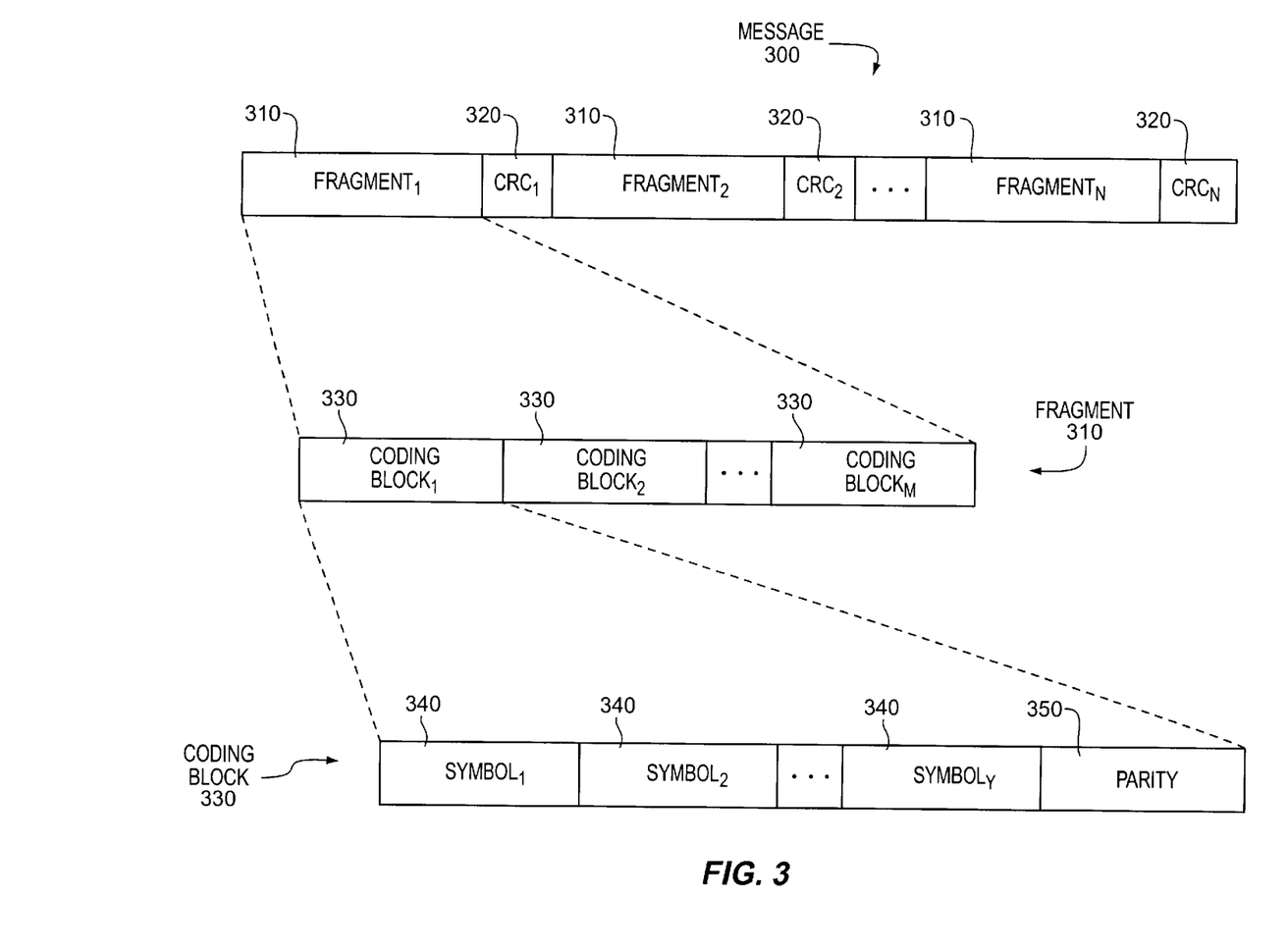
FIG. 3 illustrates an exemplary forward channel message format according to one embodiment of the present invention.

Having described the handshaking between a paging network and a wireless communication device, an exemplary message format will now be described with reference to FIG. 3. Message 300 illustrates the format of a forward channel message according to one embodiment of the present invention. In this example, message 300 includes N fragments 310 and corresponding check sums such as cyclic redundancy codes (CRCs) 320. The CRCs 320 are outside codes that facilitate the detection of errors for a particular fragment 310 by the wireless communication device.

Each fragment 310 further includes M coding blocks 330. A coding block is the unit upon which the forward error correction (FEC) encoders and decoders operate. Each coding block 330 is comprised of Y symbols 340 and a parity 350. The number of symbols 340 and size of the party 350 depends upon the forward channel coding scheme employed by the communication system. A widely used error detection and correction technique used in telecommunications applications such as paging protocols, for example, is the class of Bose-Chaudhuri-Hocquenghem (BCH) codes.

According to one embodiment of the present invention, the coding scheme employed is BCH(31,21). In this example, the coding blocks 330 include at least 31 bits, 21 of which represent data bits the remaining 10 comprising parity bits. Assuming a symbol size of 7 bits and a BCH (31,21) code, coding blocks 330 would include 3 symbols 340 and 10 bits of parity 350, for example. In alternative embodiments, the coding blocks 330 may include more or less symbols 340 and parity 350 bits and different coding schemes may be utilized, such as Reed-Solomon or block Trellis codes. However, as will be discussed below, it is preferable to use a coding scheme that allows the FEC decoder 120 to produce an error pattern that is indicative of the bit errors in a particular coding block 330.

MESSAGE PROCESSING

Figure 4:
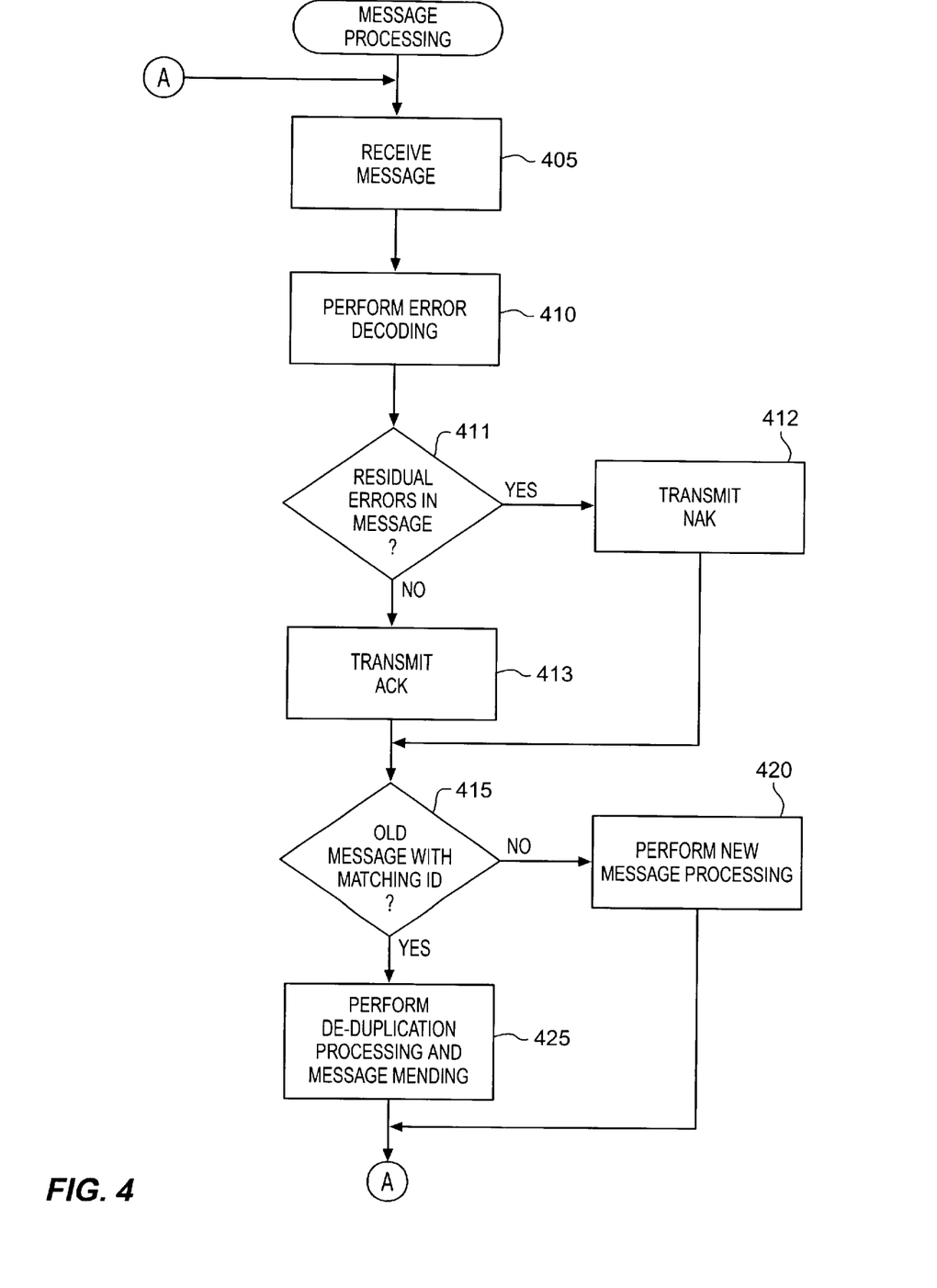
FIG. 4 is a flow diagram illustrating a method of message processing according to one embodiment of the present invention.

FIG. 4 is a flow diagram illustrating a method of message processing according to one embodiment of the present invention. At step 405, a message is received at the wireless communication device. For each coding block 330, error correction decoding is performed at step 410.

At step 411, it is determined whether or not there are residual errors in the message after error correction. If so, a NAK is transmitted to the paging network, at step 412, indicating a duplicate message should be transmitted by the paging network. However, if there are no residual errors in the received message, an ACK is transmitted to the paging network, at step 413, indicating the successful reception of the message.

At step 415, it is determined whether an old message stored in memory 165, for example, has a message id matching that of the newly received message. If no message exists with a matching id, then new message processing is performed at step 420. New message processing may include storing the message and other information related to the message (e.g., the length, number of errors, message id, time of receipt, etc.) in memory 165 and providing an indication (e.g., beeping, vibration, or flashing light) to the user to alert the user of the presence of the new message. Otherwise, de-duplication processing and message mending are performed at step 425 to distinguish between new messages and duplicate messages and further to correct a corresponding garbled message if it is determined that the message is a duplicate message.

DE-DUPLICATION AND MESSAGE MENDING PARAMETERS

Before describing the de-duplication and message mending processing, parameters upon which that processing depends will now briefly be described. According to one embodiment of the present invention, new messages and duplicate messages may be distinguished based upon one or more of the following parameters: (1) the address on which the message was received; (2) the message id; (3) the fragment length and fragment number; (4) special embedded prefixes and/or suffixes; and (5) the fragment content.

Some wireless communication devices support multiple addresses. For example, one or more addresses may be used for information services and one or more others may be employed for personal use. It should be appreciated, in a wireless communication device with multiple addresses, the search for a stored message with a message id matching that of the newly received message (step 415 above) need only consider messages also having the same address.

Message ids (also referred to as message signatures) have recently been added to paging protocols to support message acknowledgment and other functions now possible with two-way wireless communications systems. For example, messages that are not acknowledged by the wireless communication device within a certain amount of time or are negatively acknowledged by the wireless communication device may be retransmitted by the messaging system with the same message id. Ideally, each message transmitted to a wireless communication device would have a unique message id, however, the number of bits that can be allocated to the message id are finite. Therefore, over the course of time, messages having duplicate message ids will be received even for non-duplicate messages. The finite nature of message ids requires the consideration of other factors to intelligently handle duplicate messages.

Another identifying feature of a message fragment is its length. According to some communications protocols, the fragment length accompanies the transmission of each fragment of a message. However, with other protocols the fragment length may need to be determined at the wireless communication device. Importantly, the existence of special embedded prefixes and/or suffixes, such as an indication that the message has been stored or a time stamp indicating the time the message entered the paging system, for example, may prevent the direct comparison of lengths. According to one embodiment, a newly received message having the same message id as a previous message and meeting the other criteria for establishing a duplicate will be recognized as a duplicate even though the paging system or protocol has added one or more special embedded prefixes and/or suffixes. That is, the fact that two messages differ by one or more special embedded prefixes and/or suffixes is not sufficient to label the newly received message as a new message rather than a duplicate message. Additionally, message fragments are uniquely numbered within a message. Therefore, only message fragments with matching fragment numbers can be duplicates.

Also available for use in determining whether or not a message is a duplicate is the content of the fragment. If a newly received message cannot be excluded as a duplicate based upon the other factors, a comparison may be made between the content of the newly received message and the previously received message.

DE-DUPLICATION AND MESSAGE MENDING PROCESSING

Figure 5A:
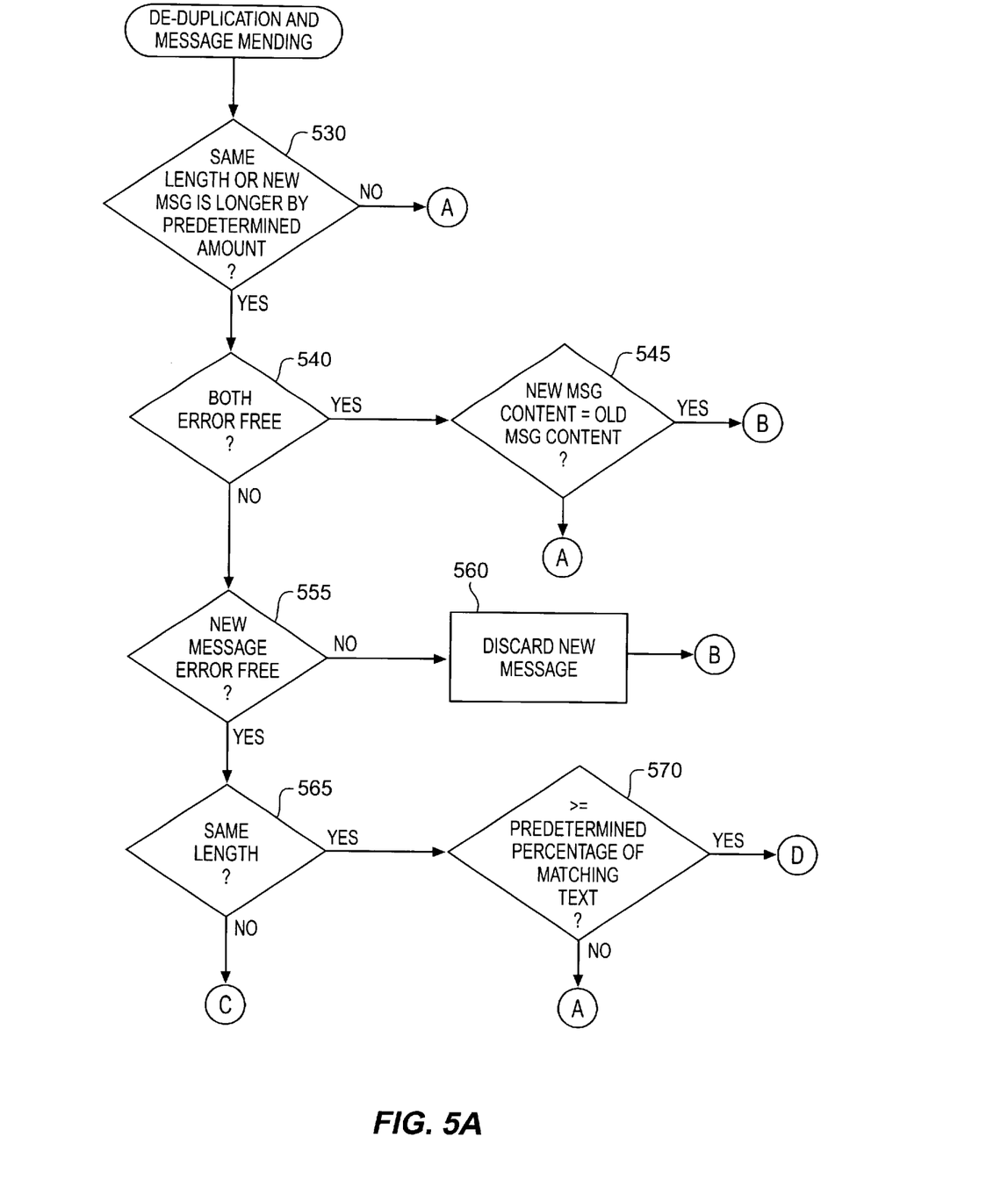
FIGS. 5A and 5B are flow diagrams illustrating a method of distinguishing between duplicate messages and new messages according to one embodiment of the present invention.
Figure 5B:
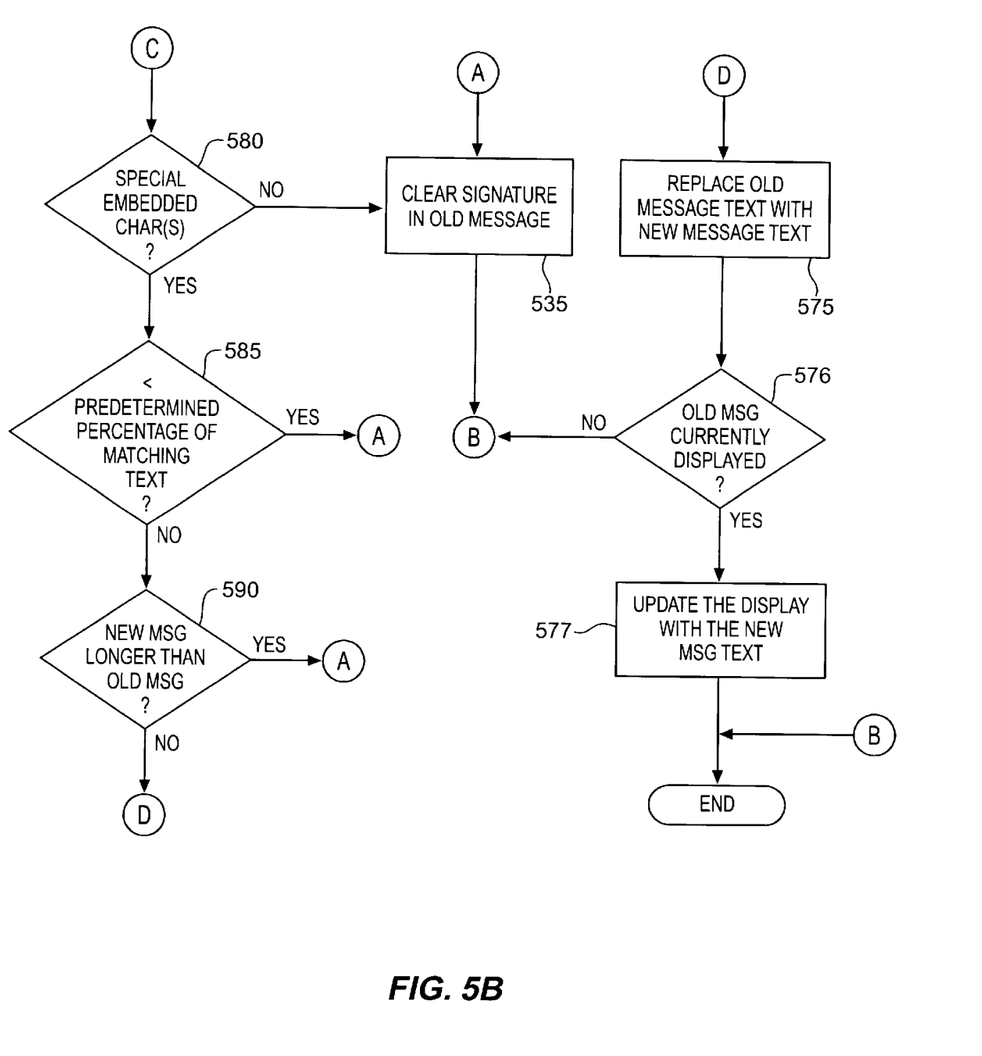

As indicated above, because message ids may be repeated for non-duplicate messages, it is not sufficient simply to compare message ids to determine whether or not a newly received message is a duplicate. FIGS. 5A and 5B are flow diagrams illustrating a method of distinguishing between duplicate messages and new messages based on one or more of the parameters discussed above according to one embodiment of the present invention.

At step 530, it is determined whether or not the two messages with matching message ids are the same length or if the newly received message is longer than the older message by a predetermined amount. The predetermined amount represents the length of the longest set of special embedded prefixes/suffixes that may be added by the particular paging system or protocol.

If neither condition of step 530 is met, at step 535, the message id of the older message is cleared. In this manner, the older message will not be compared to subsequent messages that have this message id.

If either condition of step 530 is met, step 540, tests whether or not both messages are error free. If both messages are error free, then the raw message content may be compared (step 545). If the messages are identical in content, the newly received message is considered a duplicate and processing is complete.

According to the present embodiment, a message will not be updated with a duplicate message that contains one or more errors. Therefore, at step 555, a test is performed to determine whether or not the newly received message is error free. If not, it is discarded at step 560. Otherwise, processing continues at step 565.

At step 565, it is determined whether or not the two messages are the same length. If the messages are the same length, processing continues with step 570; otherwise, processing continues with step 580. At step 570, the raw message text is compared. Because the older message is known to have one or more errors, the newly received message is considered a duplicate if the raw message text has greater than or equal to a predetermined percentage of matching text. If the messages are determined not to have at least the predetermined percentage of matching text, the newly received message is presumed to be a new message and processing continues at step 535. Otherwise, the newly received message is a duplicate and processing continues at step 575.

According to this embodiment, message mending comprises replacing a garbled message with an error free duplicate. Therefore, at step 575, the old message text is replaced with the contents of the newly received message. In alternative embodiments, bit-level and symbol-level mending may be performed as described below.

At step 576, a check is made to determine whether or not the old message is currently being displayed. If so, the display is updated to reflect the new content, at step 576.

At step 580, the messages have been determined to have different lengths. Since the difference in length may be due to the presence of special embedded characters inserted by the paging system, a test for one or more of these characters is performed. If one is found to be contained in the newly received message then processing continues at step 585. However, if no special characters are found in the newly received message, since there is no explanation for the length mismatch, the newly received message is considered a new message rather than a duplicate and processing continues with step 535.

At step 585, a comparison between the raw message contents is performed. If the raw message text of the two messages has less than the predetermined percentage of matching text, then the newly received message is treated as a new message and processing continues with step 535. Otherwise, the newly received message's length is compared to the length of the old message at step 590. If the length of the newly received message is greater than that of the older message, then the newly received message is considered a new message and processing continues with step 535. However, if the length of the newly received message is not greater, then the newly received message is considered a duplicate and processing continues with step 575.

SYMBOL-LEVEL AND BIT-LEVEL MESSAGE MENDING

Figure 6:
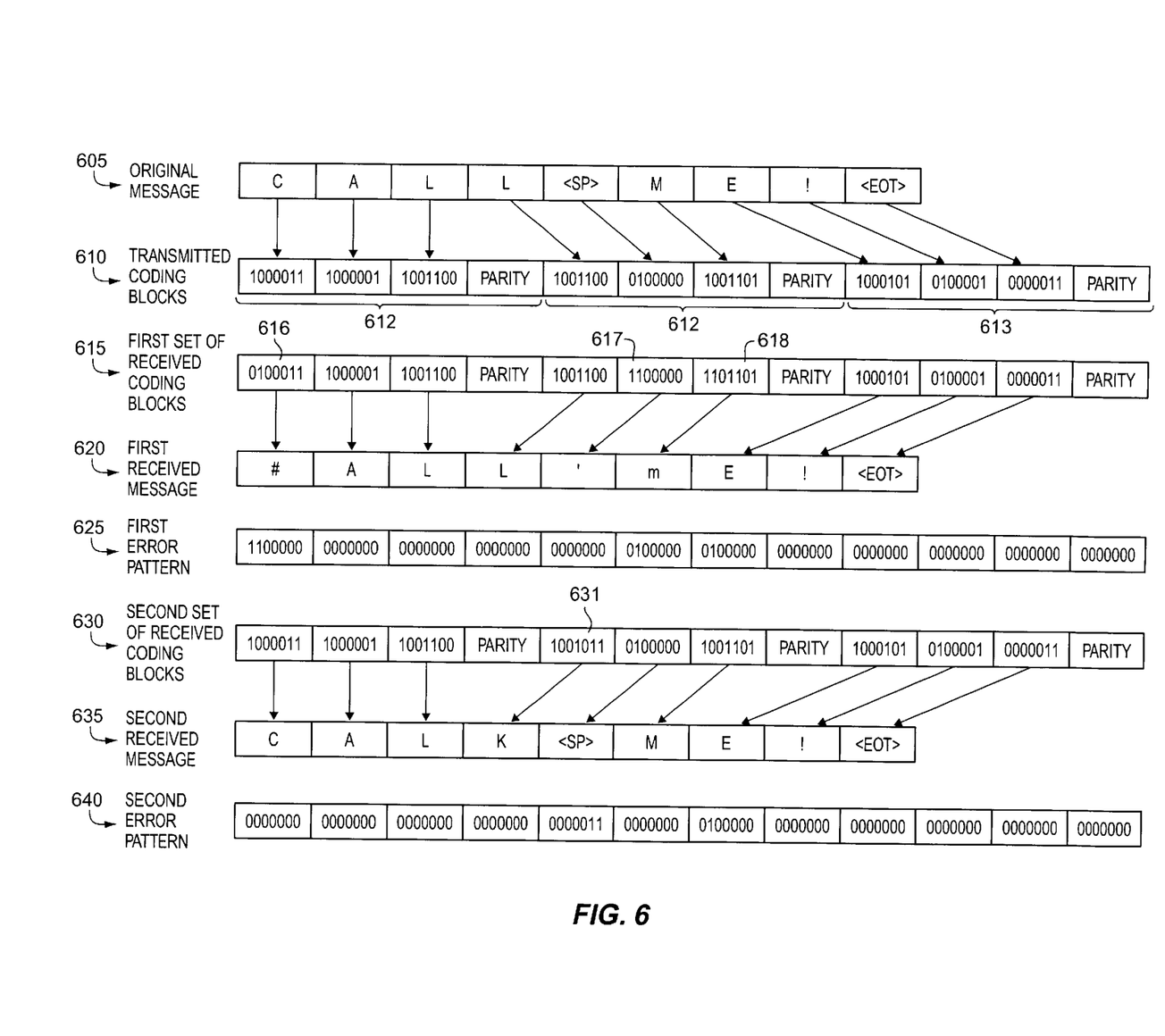
FIG. 6 a is diagram illustrating coding blocks and error patterns for exemplary messages.

FIG. 6 is useful for describing alternative approaches to message mending. Rather than correcting garbled messages only with an error free duplicate message or duplicate message that includes a correctable number of errors (message-level mending), in an alternative embodiment, a garbled message may also be mended with an imperfect duplicate message. This may be accomplished by using error patterns. An error pattern is information generated by the FEC decoder 120, for example, that identifies the precise location of errors in a particular message. Briefly, in many instances, by combining portions of a first message that are error free with portions of a second message that are error free, an error free message can be constructed.

Returning now to FIG. 6, an original message 605, and a set of transmitted coding blocks 610 as transmitted by the messaging system is depicted. Also, two messages (620 and 635) received by the wireless communication device and their respective coding blocks (615 and 630) and error patterns (625 and 640) are illustrated.

At the paging system, an original message 605 is coded by an error correction code, such as BCH, and transformed into the sequence of coding blocks 611, 612, and 613. For purposes of illustration the data has not been interleaved. In this example, error correction coding is performed on groups of three characters at a time and the 7-bit ASCII representation of the characters and the generated parity information are written into a corresponding coding block.

When the message is received at the wireless communication device, the received message 620 may differ in content from the characters that were transmitted due to errors that are introduced during transmission. In this example, "#ALL'mE!" was received as the first message rather than "CALL ME!". The second message (the duplicate message) 635 was received as "CALK ME!". Referring to the error patterns (625 and 640), a one indicates a bit error location while a zero indicates a correctly received bit. Based upon this information, mutually exclusive error-free portions of the first message 620 and the second message 635 may be combined to create an error-free message that can be presented to the user. In this example, symbols corresponding to the three symbols (616, 617, and 618) that were received incorrectly in the first message 620 may be selected from the second message 635 and the symbol corresponding to the one symbol 631 received incorrectly in the second message 635 may be selected from the first message 620. The remaining symbols may be selected from either the first message 620 or the second message 635. In this manner, an error free message may be constructed at a symbol level from two messages containing errors. It should be appreciated this approach may be used at a bitlevel as well.

ALTERNATIVE EMBODIMENTS

Figure 7:
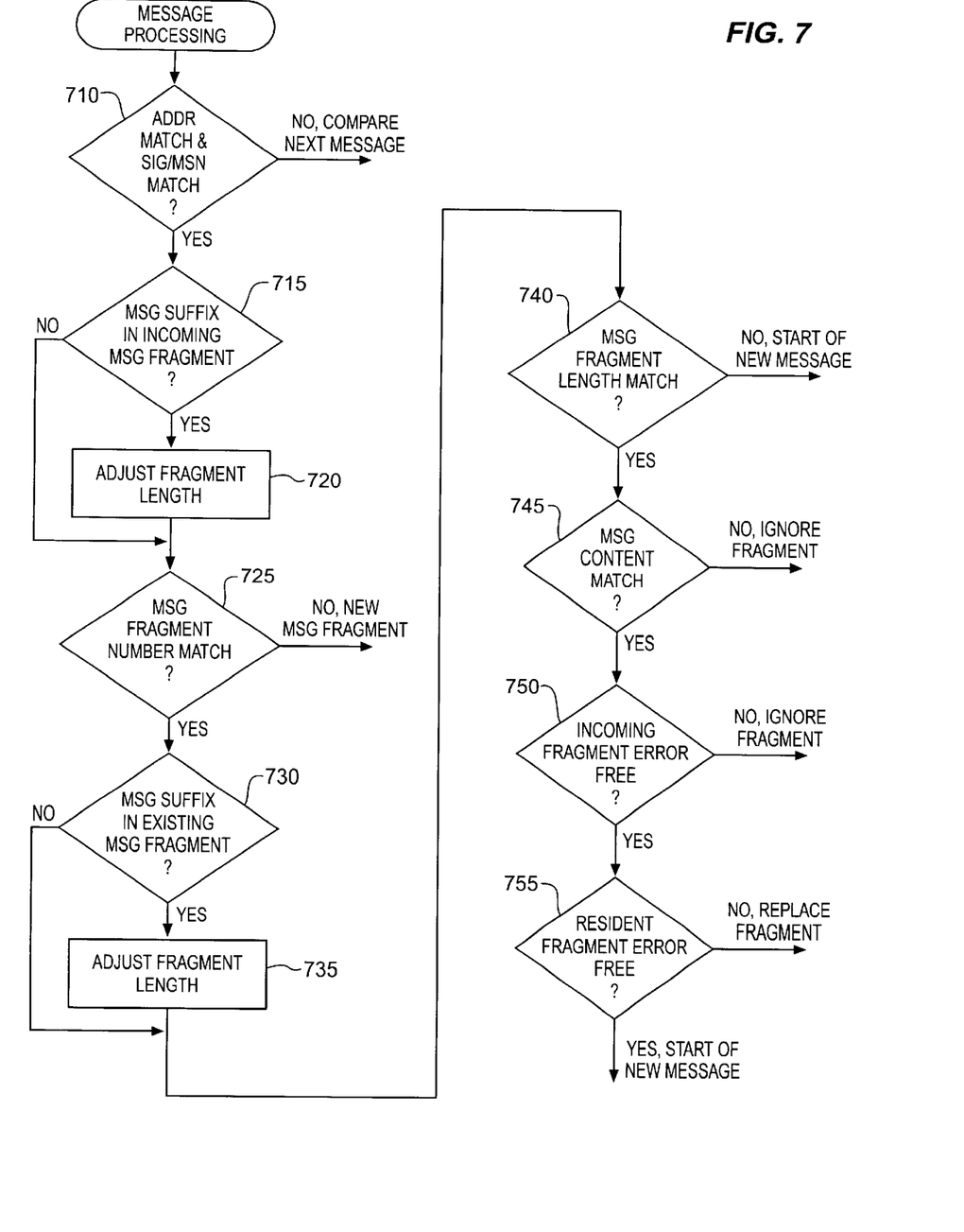
FIG. 7 is a flow diagram illustrating a method of message processing according to an alternative embodiment of the present invention.

Many alternative embodiments are contemplated by the inventors of the present invention. For example, FIG. 7 is a flow diagram illustrating a method of message processing according to an alternative embodiment of the present invention. According to this embodiment, when a message fragment is received stored fragments are compared to the newly received fragment. Fragments that do not have a matching address and a matching message id are skipped and processing continues with the next stored fragment (step 710). If a system prefix/suffix is in the message fragment (step 715), then the fragment length is adjusted to exclude the system prefix/suffix (step 720). If the message fragment number does not match, then the message fragment is treated as a new message fragment (step 725). However, if the message fragment number matches the message fragment of a previous message fragment, then the message fragment lengths are compared at step 740 after the existing message fragment's length is adjusted to compensate for the existence of a system prefix/suffix (steps 730 and 735). If the message fragment lengths do not match, then the message fragment is part of a new message. Otherwise, if the message fragment lengths match, then the content of the fragments is compared (step 745). If the content of the existing and newly received fragments do not match, the newly received fragment is ignored (step 745). Otherwise, the newly received message fragment replaces the resident fragment if the incoming fragment is error free and the resident fragment contains one or more residual errors.

One advantage of providing duplication detection logic at the message fragment level is that it allows messages to be interleaved.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of correcting erred messages in a wireless communication device, the method comprising:

receiving a first message fragment at the wireless communication device, the first message fragment including an embedded message identifier and an embedded fragment number generated by a messaging system for the purpose of interleaving transmission of message fragments;

receiving a second message fragment at the wireless communication device, the second message fragment including an embedded message identifier and an embedded fragment number generated by a messaging system for the purpose of interleaving transmission of message fragments;

determining the second message is a duplicate of the first message fragment based upon a plurality of parameters including the embedded message identifier and embedded fragment number; and correcting the first message fragment based upon the second message fragment sent from the messaging system in response to a communication protocol between the messaging system and the wireless communication device after determining the first message fragment contains one or more errors.

2. The method of claim 1, further including determining whether any errors are present in the second message fragment.

3. The method of claim 2, further including:

determining a first error pattern based upon error correction information contained in the first message fragment, the first error pattern identifying one or more portions of the first message fragment that are in error; and determining a second error pattern based upon error correction information contained in the second message fragment; and wherein correcting the first message fragment based upon a second message fragment includes combining zero or more portions of the first message fragment and one or more portions of the second message fragment based upon the first and second error patterns.

4. The method of claim 2, wherein said correcting the first message fragment based upon a second message fragment occurs only if no errors are determined to be present in the second message fragment.

5. The method of claim 1, wherein the method further includes determining the second message fragment is a duplicate of the first message fragment based upon the message identifier and fragment number embedded in the first message, the message identifier and fragment number embedded in the second message, and contents of the first and second message fragments.

6. The method of claim 5, wherein said determining the second message fragment is a duplicate of the first message fragment further includes:

comparing the first message identifier to the second message identifier;

comparing the first fragment number to the second fragment number; and determining if the contents of the first and second message fragments have at least a predetermined percentage of matching content.

7. The method of claim 6, wherein the predetermined percentage of content is 100%.

8. The method of claim 6, wherein the predetermined percentage of content is a codeplug parameter.

9. The method of claim 5, wherein the first message fragment is associated with a first address, the second message fragment is associated with a second address, and said determining the second message fragment is a duplicate of the first message fragment further includes determining the first address is equal to the second address.

10. The method of claim 5, wherein said determining the second message fragment is a duplicate of the first message fragment is further based upon the relative lengths of the first and second message fragments.

11. The method of claim 5, wherein said determining the second message fragment is a duplicate of the first message fragment is further based upon the presence of one or more embedded system prefixes or suffixes in either the first or second message fragments.

12. A wireless communication device comprising:

a receiver configured to receive message fragments transmitted over a forward channel from a messaging system, the message fragments each including an embedded message identifier and an embedded fragment number generated by the messaging system for the purpose of interleaving transmission of message fragments to individual wireless communication devices;

a transmitter configured to transmit responses over a reverse channel to the messaging system; and a processor coupled to the receiver to receive message fragments from the messaging system, the processor further coupled to the transmitter to transmit acknowledgments to the messaging system, the processor configured to correct a garbled message fragment by determining whether or not a second message fragment is a duplicate of the garbled message fragment based upon the embedded message identifiers and fragment numbers of the garbled message fragment and the second message fragment, and if the second message fragment is a duplicate of the garbled message fragment, then correcting the garbled message fragment based upon the second message fragment.

13. The wireless communication device of claim 12, further comprising an error correction decoder coupled to the receiver and the processor, the error correction decoder configured to determine whether any errors are present in the second message fragment by performing error correction decoding.

14. The wireless communication device of claim 13, wherein the error correction decoder produces a first error pattern and a second error pattern, the first error pattern is based upon parity information contained in the garbled message fragment, the first error pattern identifying one or more portions of the garbled message fragment that are in error, the second error pattern is based upon parity information contained in the second message fragment, and wherein the processor is further configured to combine zero or more portions of the garbled message fragment and one or more portions of the second message fragment based upon the first error pattern and the second error pattern.

15. The wireless communication device of claim 13, wherein the processor is configured to correct the garbled message fragment based upon the second message fragment only if the second message fragment is determined to have no errors by the error correction decoder.

16. The wireless communication device of claim 12, further comprising a display to present messages to the user, the processor configured to update the display if the garbled message fragment is being presented to the user when the garbled message fragment is corrected based upon the second message fragment.

17. A method of correcting garbled messages in a wireless communication device operated by a user, the method comprising:

receiving a first message fragment at the wireless communication device containing an embedded message identifier and an embedded fragment number generated by a messaging system for the purpose of interleaving transmission of message fragments, the first message fragment including one or more errors;

receiving a second message fragment at the wireless communication device;

determining whether or not the second message fragment is a duplicate of the first message fragment; and if the second message fragment is a duplicate of the first message fragment, then correcting the one or more errors in the first message fragment based upon the second message fragment.

18. The method of claim 17, wherein the second message fragment includes an embedded message identifier and an embedded fragment number generated by the messaging system, and said determining whether or not the second message fragment is a duplicate of the first message fragment is based upon the embedded message identifier and fragment number of the first message fragment, the embedded message identifier and fragment number of the second message fragment, and contents of the first and second message fragments.

19. The method of claim 17, wherein the wireless communication device includes a display for presenting messages to the user, the method further including updating the display to reflect corrected information if the first message fragment is currently being presented to the user.

20. The method of claim 17, wherein the wireless communication device is participating in a communication network supporting a forward channel from the messaging system to the wireless communication device and a reverse channel from the wireless communication device to the messaging system.

21. The method of claim 20, wherein the wireless communication device is a pager and the messaging system is a paging system.

22. The method of claim 20, further including:

performing error correction on the first message fragment;

if there are residual errors in the first message fragment, then transmitting a first response to the messaging system over the reverse channel signaling the messaging system to transmit a duplicate of the first message fragment; and if there are no residual errors in the first message fragment, then transmitting a second response to the messaging system over the reverse channel signaling the messaging system to refrain from transmitting a duplicate of the first message fragment.

23. The method of claim 22, wherein the first response comprises a negative acknowledgment (NAK) and the second response comprises an acknowledgment (ACK).

24. The method of claim 3, wherein the size of said portion is one bit.

25. The method of claim 14, wherein the size of said portion is one bit.

26. A wireless communication device, comprising:

means for receiving a first message fragment at the wireless communication device, the first message fragment including an embedded message identifier and an embedded fragment number generated by a messaging system for the purpose of interleaving transmission of message fragments; and means for receiving a second message fragment at the wireless communication device, the second message fragment including an embedded message identifier and an embedded fragment number generated by a messaging system for the purpose of interleaving transmission of message fragments;

means for determining the second message is a duplicate of the first mess age fragment based upon a plurality of parameters including the embedded message identifier and embedded fragment number; and means for correcting the first message fragment based upon the second message fragment sent from the messaging system in response to a communication protocol between the messaging system and the wireless communication device after determining the first message fragment contains one or more errors.

27. The wireless communication device of claim 26, further including means for determining whether any errors are present in the second message fragment.

28. The wireless communication device of claim 27, wherein said determining includes:

determining a first error pattern based upon error correction information contained in the first message fragment, the first error pattern identifying one or more portions of the first message fragment that are in error;

determining a second error pattern based upon error correction information contained in the second message fragment; and wherein said correcting the first message fragment based upon a second message fragment includes combining zero or more portions of the first message fragment and one or more portions of the second message fragment based upon the first and second error patterns.

29. The wireless communication device of claim 26, further including means for determining the second message fragment is a duplicate of the first message fragment based upon the message identifier and fragment number embedded in the first message, the message identifier and fragment number embedded in the second message, and contents of the first and second message fragments.

30. The wireless communication device of claim 29, wherein said determining the second message fragment is a duplicate of the first message fragment includes:

comparing the first message identifier to the second message identifier;

comparing the first fragment number to the second fragment number; and determining if the contents of the first and second message fragments have at least a predetermined percentage of matching content.

31. The wireless communication device of claim 29, wherein said determining the second message fragment is a duplicate of the first message fragment is further based upon the relative lengths of the first and second message fragments.

* * * * *